United States Patent [19]

Kim

[11] Patent Number: 5,232,089

[45] Date of Patent: Aug. 3, 1993

[54] APPARATUS FOR STORING COMPACT DISK CONTAINERS

[76] Inventor: Young S. Kim, 22573 Woodridge Ct., Cupertino, Calif. 95014

[21] Appl. No.: 892,553

[22] Filed: Jun. 1, 1992

[51] Int. Cl.⁵ .................................................. B65D 85/30
[52] U.S. Cl. ..................... 206/309; 206/312; 206/472; 206/473; 206/483; 211/40; 211/41
[58] Field of Search ............... 206/309, 387, 444, 454, 206/456, 470, 472, 473, 477, 483, 490, 564, 815, 312; 211/40, 41

[56] References Cited

U.S. PATENT DOCUMENTS

| | | | |
|---|---|---|---|
| 2,968,882 | 1/1961 | Ozeki | 206/456 |
| 3,489,313 | 1/1970 | Haugen | 206/815 |
| 3,604,556 | 9/1971 | Schwartz | 206/815 |
| 3,848,738 | 11/1974 | Hirsch | 206/472 |
| 4,236,635 | 12/1980 | Namiki | 206/456 |
| 4,676,374 | 6/1987 | Wilkins | 206/309 |
| 4,691,826 | 9/1987 | Ozeki | 206/454 |
| 4,781,292 | 11/1988 | Sacherman et al. | 206/309 |
| 4,823,950 | 4/1989 | Roze | 206/387 |
| 4,940,147 | 7/1990 | Hunt | 211/40 |
| 4,972,951 | 11/1990 | Vartanian | 206/387 |
| 5,040,687 | 8/1991 | Whittington | 211/40 |
| 5,078,270 | 1/1992 | Campbell | 206/444 |
| 5,119,574 | 6/1992 | King | 206/470 |

FOREIGN PATENT DOCUMENTS 418285  1/1992  Japan ................................ 206/309

*Primary Examiner*—David T. Fidei
*Attorney, Agent, or Firm*—Flehr, Hohbach, Test, Albritton & Herbert

[57] ABSTRACT

An apparatus for storing a plurality of compact disk containers. The apparatus includes a storage array divided into a plurality of compartments each formed to receive one compact disk container. The storage array is configured to hold the containers in a common plane defined by the container base. The apparatus also includes a retention device for securing one compact disk container within each compartment.

24 Claims, 5 Drawing Sheets

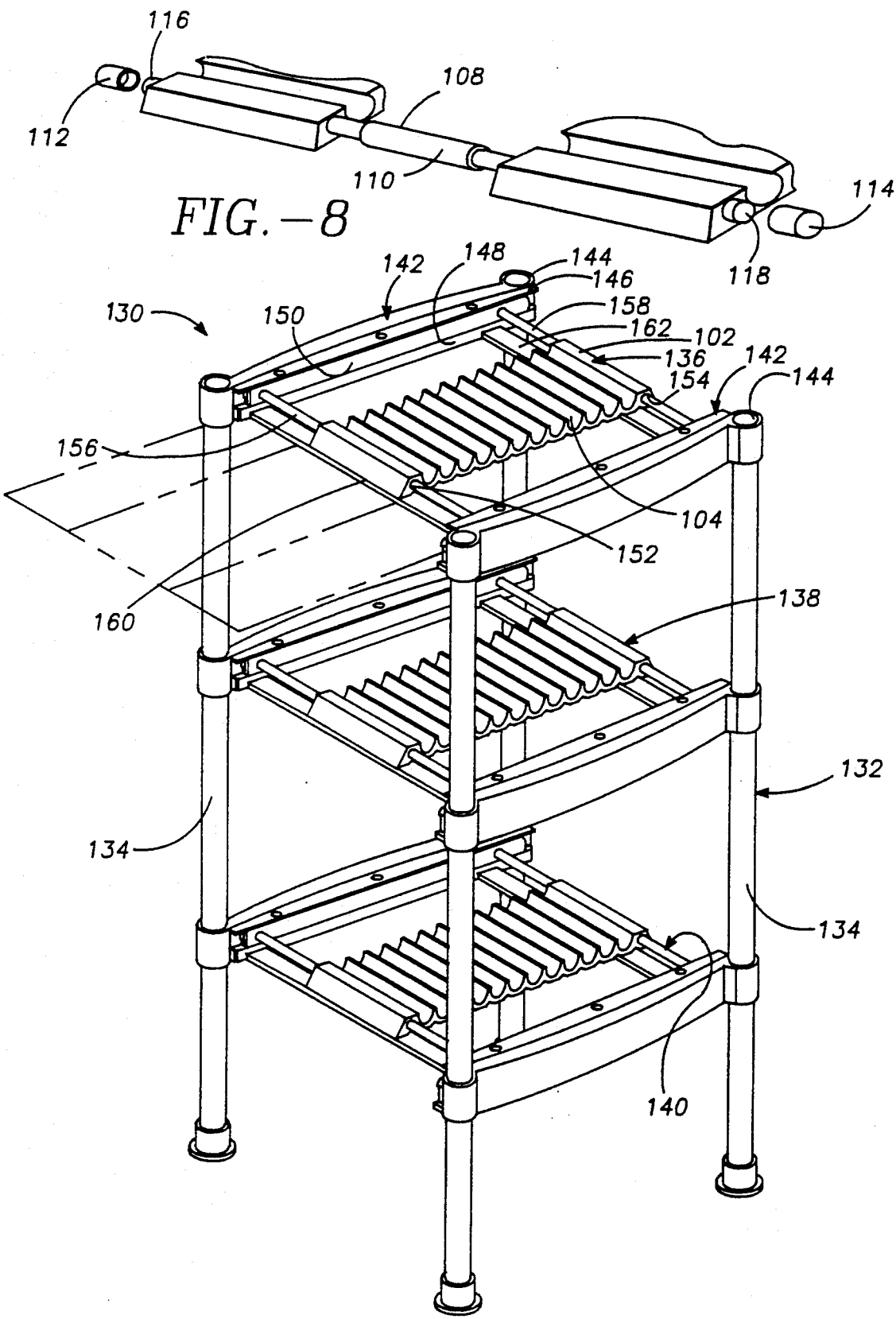

APPARATUS FOR STORING COMPACT DISK CONTAINERS

BACKGROUND OF THE INVENTION

1. Field of the Invention

The present invention relates in general to a storage apparatus for compact disks. More particularly, the present invention relates to an apparatus for storing a plurality of compact disk containers.

2. Description of the Prior Art

The compact disk is an increasingly popular medium for distributing recorded music. Because of the enhanced sound quality and durability available from a laser recording, the compact disk is favored over cassette tapes and albums. Most compact disks are held within a plastic container for protection during storage. The typical container includes a base formed to support the disk and a hinged cover which is pivotable from a closed position to an open position for retrieval of the disk.

The compact size of a disk, one fourth the size of a record album, substantially reduces the amount of space needed for storing disks compared to that required for the traditional albums. The disk containers are usually stacked in a horizontal row for storage on an ordinary shelf or in an entertainment cabinet with the stereo equipment. Most entertainment cabinets have widely spaced shelves primarily adapted for storing the taller traditional albums. Similarly, ordinary shelves are vertically separated by a distance substantially greater than the height of a disk container. As a result, a substantial amount of available storage space above the row of disk containers is wasted. Most shelves are also much wider than the disk container. This extra space may not be efficiently used without preventing access to the disk containers positioned at the back of the shelf. Thus, one of the advantages of the disks, their compact size, is not being fully utilized.

Various devices have been developed for storing compact disks. One type of device is shaped as a cube and has four sides which are configured to hold several disk containers in parallel alignment. The cube-shaped device provides an attractive method for storing a number of disks, but does not fully utilize available shelf space. Another type of device currently available includes a horizontal shelf having a plurality of parallel grooves. The disk container is slipped into a groove, which is formed to hold the container in a substantially vertical orientation. As with the storage cube, the shelf device does not take full advantage of the available storage space.

Selected musical recordings are available as a set of four compact disks. The packaging for the multiple disks includes a box having a plastic tray divided into four compartments arranged in a square. Each compartment includes a pair of finger slots formed on opposing walls for use when removing the disk containers from the packaging. The compact disks may be stored within the packaging to more efficiently utilize the available storage space by using the area in front of and above the row of individual disk containers. However, the box itself is somewhat thick, and will occupy a significant portion of the shelf, displacing several disks from the row of individual containers. In addition, storing the compact disks within the box is quite cumbersome since the box must be removed from the shelf and opened each time a user wishes to select a disk for play. Storing the disk containers in the plastic tray alone is not feasible, since the box is necessary for stability and for retaining the containers within the compartments.

One type of storage device does maximize the use of available storage area between adjacent shelves. The storage frame device consists of a plurality of wooden rods affixed to supports and arranged to form a number of vertically spaced shelves. By creating additional shelves, the storage frame substantially increases the number of disk containers which may be stored in the entertainment cabinet or on the ordinary shelf. Since the storage frame has a predetermined size, the device may not properly fit within the entertainment cabinet or on the shelving. The storage frame may be either too large to fit within the individual area or too small to maximize the use of the available storage space.

To take full advantage of the compact size of disk containers, a storage apparatus which utilizes a portion of the space available above a row of parallel containers is desirable. The available storage capacity for the disk containers varies with the individual user. Therefore, an apparatus which could be efficiently used with shelving arrangements of various sizes would be particularly useful.

When desiring to play a particular recording, the user selects a compact disk, pivots the cover of the disk container to an open position and removes the disk. Occasionally, the cover will stick while in the closed position. Since the disk container has a very narrow width, opening the cover becomes quite difficult. Before retrieving the disk, the disk container must be removed from the storage device. The disk containers must be carefully removed from and precisely positioned in the storage device. Thus, playing a compact disk is both time consuming and inconvenient as special care must be taken when handling a disk container.

A storage apparatus which allowed for retrieval of the compact disk without first removing the container from the apparatus is highly desirable. An apparatus which provides permanent storage for disk containers and facilitates the opening of the container cover would be especially desirable.

SUMMARY OF THE INVENTION

Accordingly, a primary object of the present invention is to provide an apparatus for storing compact disk containers which maximizes the utilization of the available storage capacity.

A further object of the present invention is to provide an apparatus for storing compact disk containers which may be used for facilitating storage of compact disks in areas of various sizes.

Another object of the present invention is to provide an apparatus for storing compact disk containers which allows for retrieval of the compact disk for play while the disk container remains within the storage apparatus.

Yet another object of the present invention is to provide an apparatus for storing compact disk containers which facilitates the opening of the cover and the removal of the disk from the container.

A more general object of the present invention is to provide an apparatus for storing compact disk containers which is convenient to use, may be efficiently and inexpensively manufactured, and which has an attractive appearance.

The apparatus of the present invention has other objects and features of advantage which will become apparent from and are set forth in more detail in the Detailed Description of the Invention and the accompanying drawings.

In summary, the present invention is particularly suitable for storing a plurality of compact disk containers of the type having a base for supporting a compact disk and a cover which is pivotable about a hinged end between a closed position and an open position. The apparatus includes a storage array which is divided into a plurality of compartments. The storage array is configured to hold the containers in a common plane which is defined by the container base. Each compartment is formed to receive one compact disk container. The apparatus is further configured for securing a disk container within each compartment.

In one embodiment of the present invention, the storage apparatus also includes a cover release member and a disk removal member. The cover release member is positioned to facilitate release of the container cover to pivot the cover from a closed position to an open position. The disk removal member is positioned and configured to facilitate the removal of the compact disk from the container. Thus, a compact disk may be retrieved for play while the disk container remains in the storage apparatus of the present invention.

BRIEF DESCRIPTION OF THE DRAWINGS

FIG. 8 is a partially exploded isometric view of a portion of the storage apparatus of FIG. 7.

FIG. 9 is an exploded isometric view of an additional embodiment of a storage apparatus in accordance with the present invention.

DETAILED DESCRIPTION OF THE INVENTION

Figure 1:
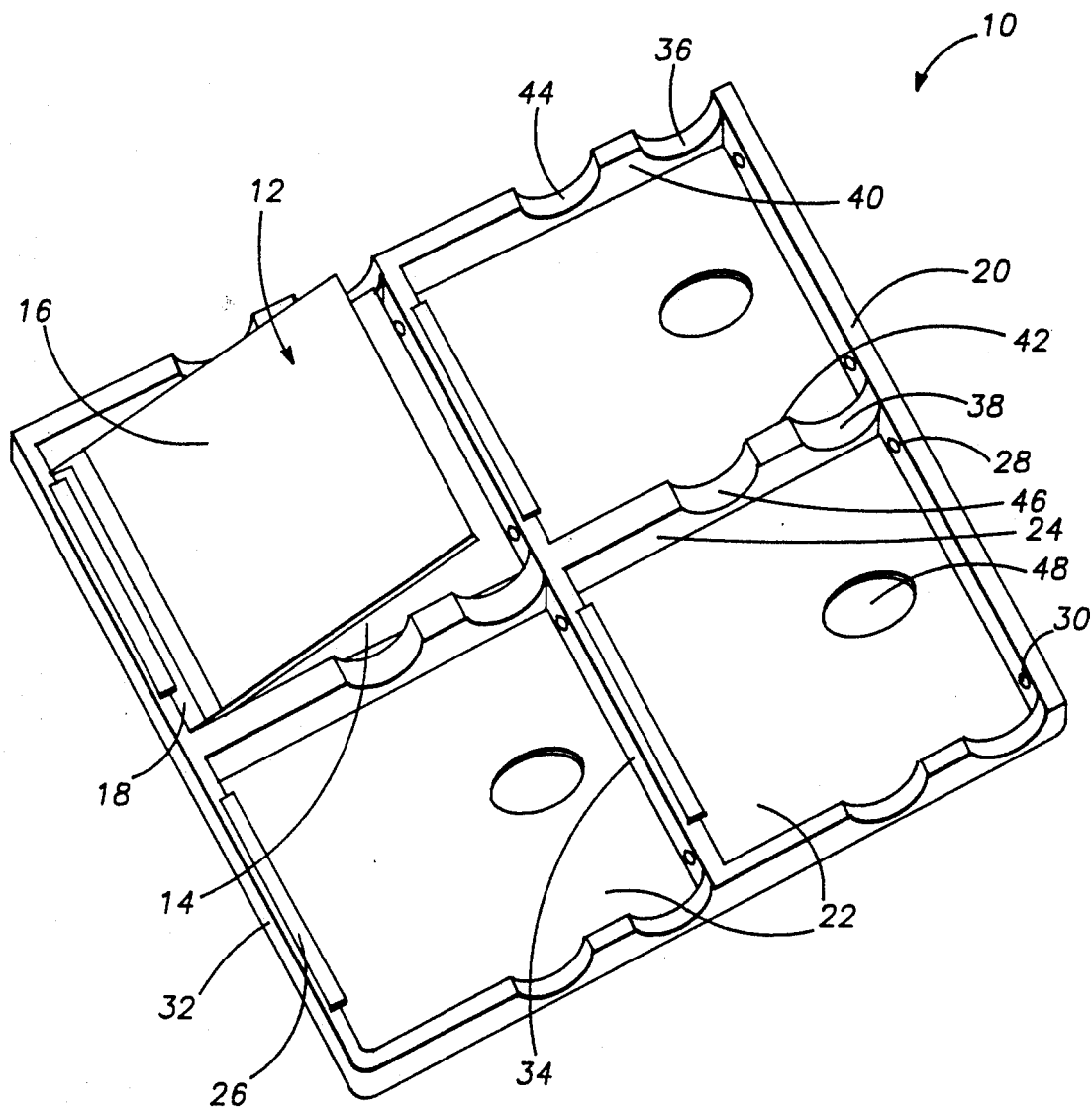
FIG. 1 is an isometric view of an apparatus for storing compact disk containers in accordance with the present invention shown holding one compact disk container.

Reference will now be made in detail to the preferred embodiment of the invention, which is illustrated in the accompanying figures. Turning now to the drawings, wherein like components are designated by like reference numerals throughout the various figures, attention is initially directed to FIGS. 1 and 2.

Storage apparatus 10 incorporating the present invention is particularly suitable for storing a plurality of compact disk containers. Turning specifically to FIG. 1, a disk container 12 which is held within storage apparatus 10 includes a base 14 formed for supporting a compact disk (not shown). A cover 16 is connected to the base along a hinged end 18. To remove the disk from container 12, cover 16 is pivoted about hinged end 18 from a closed position to an open position. For clarity, the cover is shown in a partially open position.

Figure 2:
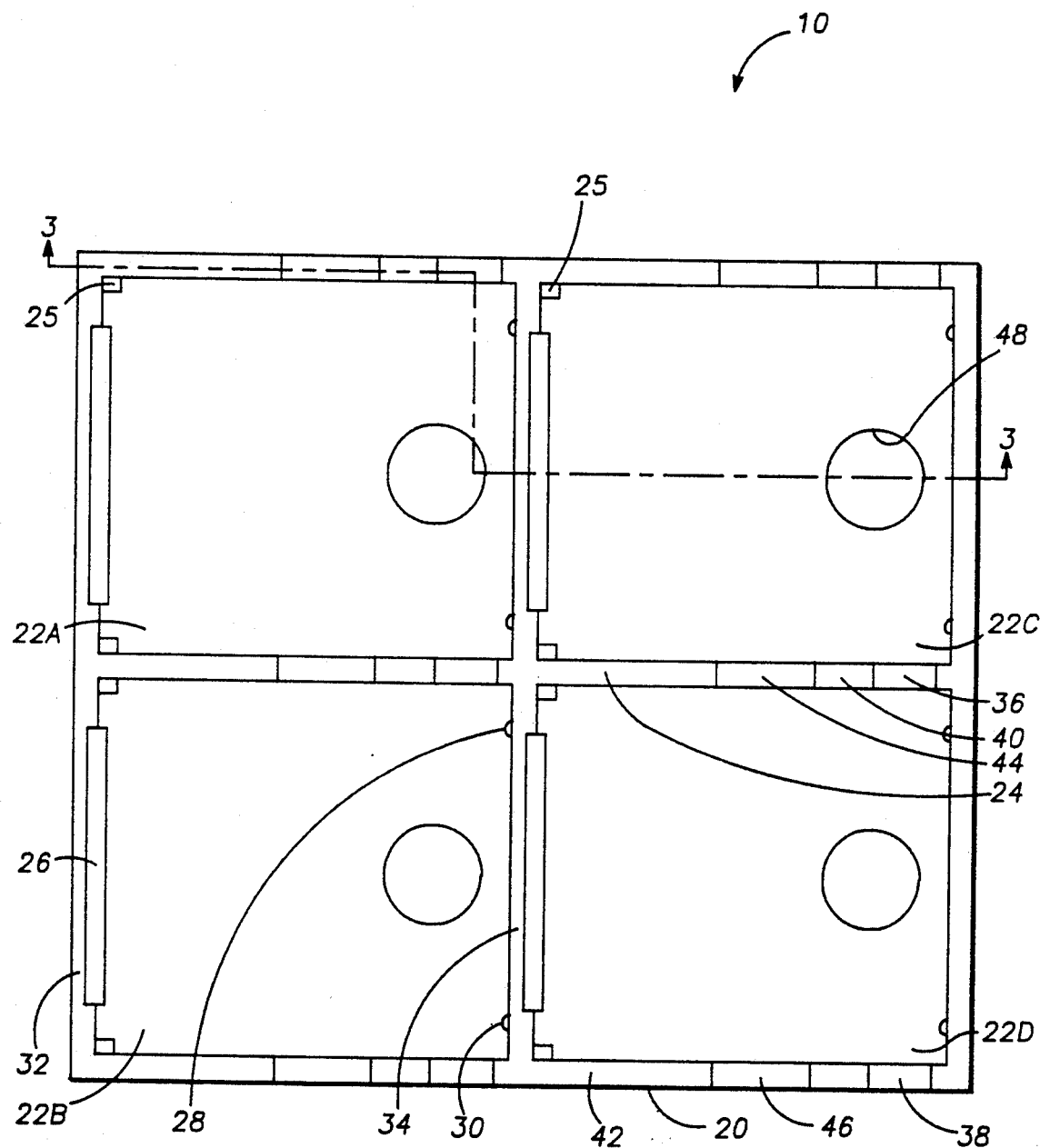
FIG. 2 is a front plan view of the storage apparatus of FIG. 1.

Storage apparatus 10 includes a storage array 20 for holding a plurality of disk containers in a common plane defined by base 14. The storage array is divided into a plurality of compartments 22 defined by a partition wall 24. The compartments are each configured to hold one container 12. As shown in FIGS. 1 and 2, compartments 22 have a rectangular shape substantially similar to the design of container 12. The shape of the compartments is a matter of design choice, and other shapes such as a circle or an elongated oval may be used to provide storage array 20 with a different appearance.

In the illustrated embodiment, storage array 20 includes four compartments 22A, 22B, 22C, 22D arranged in two rows each having two compartments. With this arrangement, the storage array is substantially similar in size to the traditional record album. Storage apparatus 10 may be used with devices originally intended for housing record albums. Thus, the storage apparatus of the present invention is particularly attractive to a user who has invested considerable expense to attractively store his records. Although not shown in the drawings, the present invention encompasses additional embodiments of storage apparatus 10 having a different number of compartments 22 within storage array 20. The compartments may also be arranged differently within the storage array. For example, instead of having two rows of compartments 22, the compartments may be aligned in a single row within the storage array.

Figure 3:
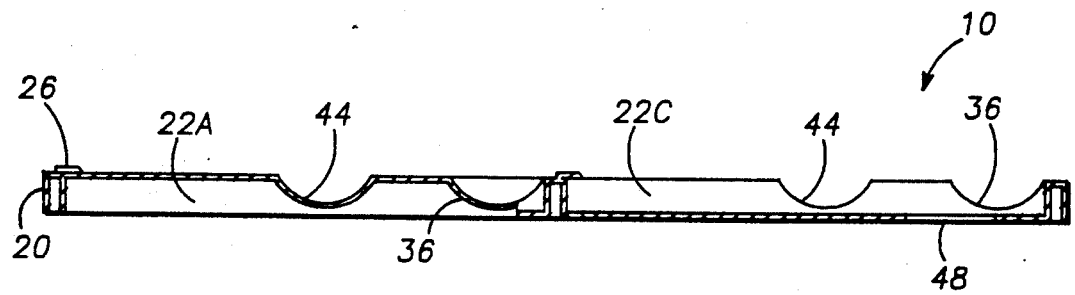
FIG. 3 is a cross sectional view of the storage apparatus taken along line 3—3 in FIG. 2.
Figure 4:
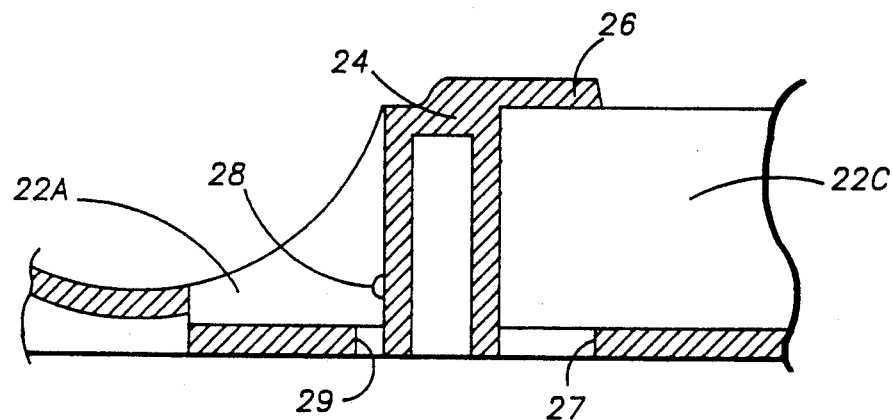
FIG. 4 is an enlarged view of a portion of the storage apparatus indicated by the circle in FIG. 3.

Turning to FIGS. 1, 3 and 4, storage apparatus 10 also includes retention means for securing the container within compartment 22, such as protruding ridge 26 and projections 28, 30. In the illustrated embodiment, the protruding ridge is formed along a first side 32 of compartment 22, while the projections extend from a second side 34. The protruding ridge and the projections interact to retain container 12 within compartment 22.

Protruding ridge 26 is configured to secure hinged end 18 without interfering with the movement of cover 16, while projections 28, 30 retain the back edge of container 12 in compartment 22 with the hinged end positioned under the protruding ridge. As is particularly shown in FIG. 1, protruding ridge 18 covers a portion of hinged end 18 but does not contact cover 16, leaving the cover freely pivotable about the hinged end. To prevent the corners of the container cover from scratching or damaging the storage device, L-shaped slots 25 are formed in the upper and lower corners of each compartment (FIG. 2). As the cover pivots, the corners pass through the slots. Therefore, while container 12 is held within storage array 20, the cover may be opened and a disk removed from the container.

In the present embodiment, two projections 28 and 30 extend from partition wall 24 into each compartment. However, including only one projection or additional projections within compartment 22 is within the scope of the present invention. Additionally, projections 28 and 30 are shown as being formed on the side of compartment 22 opposite that of protruding ridge 26. The projections may similarly extend into compartment 22 from any of the other sides of the compartment. With a compartment having a different shape, placing the projections at alternative positions along partition wall 24 would be particularly desirable.

In the preferred embodiment, storage apparatus 10 is manufactured by injection molding. Slots 27 and holes 29 are formed directly below protruding ridge 26 and projections 28, 30 respectively for facilitating the injection molding process. However, other manufacturing processes may be used to produce the storage apparatus of the present invention.

Figure 5:
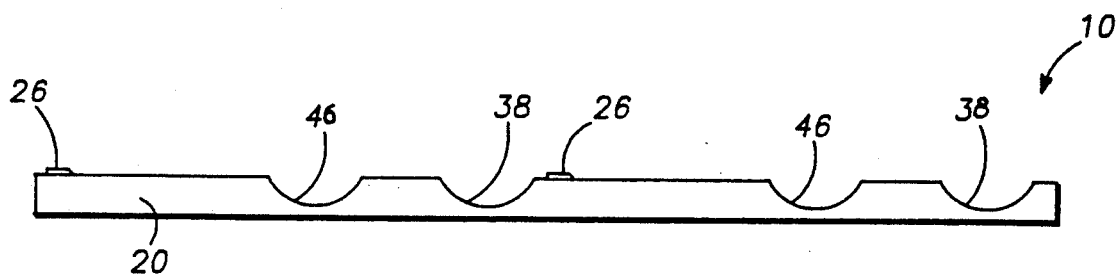
FIG. 5 is a bottom elevational view of the storage apparatus of FIG. 1.

As is shown in FIGS. 1, 3 and 5, storage apparatus 10 of the present invention includes cover release means, such as release indentations 36 and 38, for facilitating the release indentations 36 and 38, for facilitating the release of cover 16 to pivot the cover into an open position. The release indentations are formed in partition wall 24 along third and fourth sides 40 and 42 of compartment 22. For maximum effectiveness, release indentations 36 and 38 are positioned near the edge of cover 16 opposite hinged end 18. To open the container, the user grasps the cover and the container edges exposed by indentations 36 and 38 between his thumb and forefinger and pulls the cover free from the closed position.

The release indentations may be positioned at different locations along partition wall 24, exposing another portion of the container edge. Additionally, only one or more than two release indentations may be formed in partition wall 24 to assist the user when opening the container. In the present embodiment, where the shape of compartment 22 is substantially similar to that of container 12, release indentations 36 and 38 are particularly useful for opening cover 16. Storage array 20 may be formed without having release indentations, in which case the user would open the container by grasping a portion of cover 16 which is exposed above the partition wall. On the other hand, in alternative embodiments where compartments 22 have other shapes, release indentations 36 and 38 may be unnecessary. The other shape may provide the user with sufficient access to the edges of container 12 for facilitating release of the cover from the closed position.

To facilitate removal of the disk from container 12, storage apparatus 10 includes disk removal means, such as removal indentations 44 and 46 formed in partition wall 24. The removal indentations are located along third and fourth sides 40, 42 at a position providing the most direct access to the compact disk. As is shown in FIGS. 1 and 2, the positioning of removal indentations 44 and 46 corresponds to the point where the outer edge of the disk extends approximately to the outer edge of container 12. To remove the compact disk, the user grasps the disk edges exposed by the removal indentations with his thumb and forefinger. Indentations 44 and 46 may similarly be used when returning the disk to container 12.

In the preferred form, storage apparatus 10 includes two removal indentations positioned on the third and fourth sides of container 12. As with release indentations 36 and 38, only one or more than two removal indentations may be formed in alternative embodiments of the present invention. Alternatively, the removal indentations may be eliminated and the disk removed by grasping the edges of the disk exposed above the partition wall. Removal indentations 44 and 46 may be unnecessary with compartments having other shapes, where the shape of the compartment inherently facilitates removal of the disk from container 12.

The storage apparatus of the present invention is particularly suitable for permanently holding compact disk containers in storage. When container 12 is secured within compartment 22, the cover may easily be opened and a disk removed. On occasion, a user may desire to remove the container from storage apparatus 10. Turning to FIGS. 1 and 2, storage apparatus 10 includes ejection means, such as an aperture 48 formed in compartment 22, for facilitating removal of the container from storage array 20. When positioned within compartment 22, base 14 of the container covers aperture 48. The user may use the aperture to apply pressure to base 14 to disengage disk container 12 from projections 28 and 30, allowing hinged end 18 to be released from protruding ridge 26.

In the preferred embodiment, aperture 48 is positioned near second side 34 to facilitate disengagement of projections 28 and 30. The aperture may alternatively be placed at any other location which would assist the user in removing the container from the compartment. On the other hand, the shape of compartment 22 may in itself provide sufficient assistance for removing the container.

In the present embodiment of the invention, an individual may use more than one storage apparatus 10 for storing compact disks. The storage apparatus may be placed in devices originally intended to house the traditional albums. Alternatively, several storage apparatus may be individually placed along an ordinary shelf, in an entertainment cabinet or at another appropriate location. The storage apparatus of the present invention holds several disk containers 12 in a common plane, efficiently utilizing a substantial amount of shelf space. Several storage apparatus 10 may be grouped together, maximizing the amount of storage space available to an individual. Since the disk containers may be constantly held within storage array 20, the compact disk may be removed directly from the storage apparatus, effectively simplifying the process of retrieving a compact disk.

Figure 6:
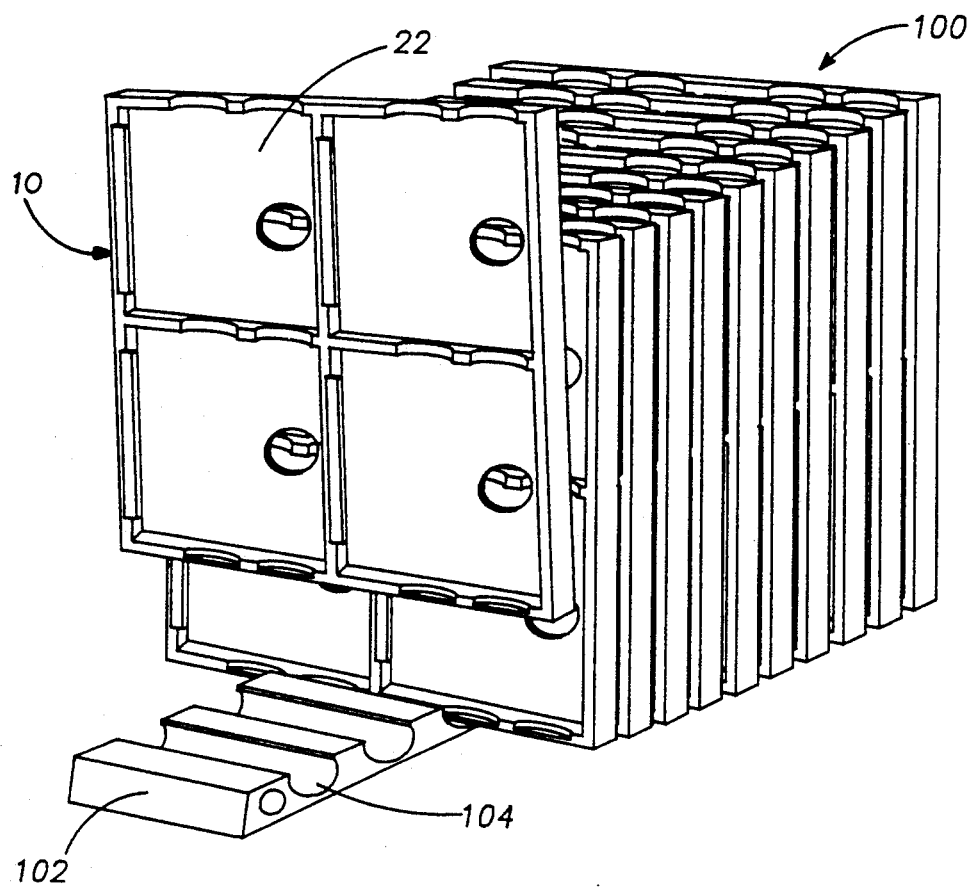
FIG. 6 is an isometric view of an alternative embodiment of a storage apparatus in accordance with the present invention.

In an alternative embodiment of the present invention, shown in FIG. 6, storage assembly 100 includes storage rack 102 having a plurality of grooves 104 for storing a plurality of storage apparatus 10 in parallel alignment. As is shown in FIG. 6, a plurality of storage apparatus 10 may be stored together in a cleaner, more organized fashion in the storage rack. Each groove 104 is substantially curved, allowing a user to pivot the storage apparatus within the groove relative to its vertical axis, enabling the user to view the storage apparatus positioned behind the pivoted apparatus 10. The user may thumb through several storage racks to find a selection in a manner similar to that used with the traditional album.

To play a selected disk, the user locates the storage apparatus 10 holding the selected disk container and removes the storage apparatus from rack 102. The disk is removed from the container, which remains within compartment 22. Since each storage apparatus is individually supported within one groove 104, removing one storage apparatus will not substantially disturb the placement of those remaining in storage rack 102. Thus, the selected storage apparatus may be conveniently removed from groove 104 to retrieve a disk for play and then returned to groove 104 for storage.

As is shown in FIG. 6, the grooves of storage rack 102 are configured for holding the plurality of storage apparatus in a substantially vertical orientation. However, a storage rack holding a plurality of storage apparatus 10 in another orientation is within the scope of the present invention. In the present embodiment, the storage rack is approximately twelve inches in length and is formed having twelve grooves. With the preferred form of storage apparatus 10, the storage rack may retain forty-eight compact disk containers within a cubic foot. Thus, the storage assembly of the present invention maximizes the use of available storage space. In alternative embodiments, the storage apparatus may be formed for retaining any number of storage apparatus 10.

The storage racks are preferably made of aluminum and are preferably formed by extrusion. While the storage racks as described are narrower than storage apparatus 10, in alternative embodiments the storage racks may be formed having substantially the same width as the storage apparatus. Several storage racks may be integrally formed as a single unit. Additionally, the storage rack may be formed using other materials and manufacturing methods.

Figure 7:
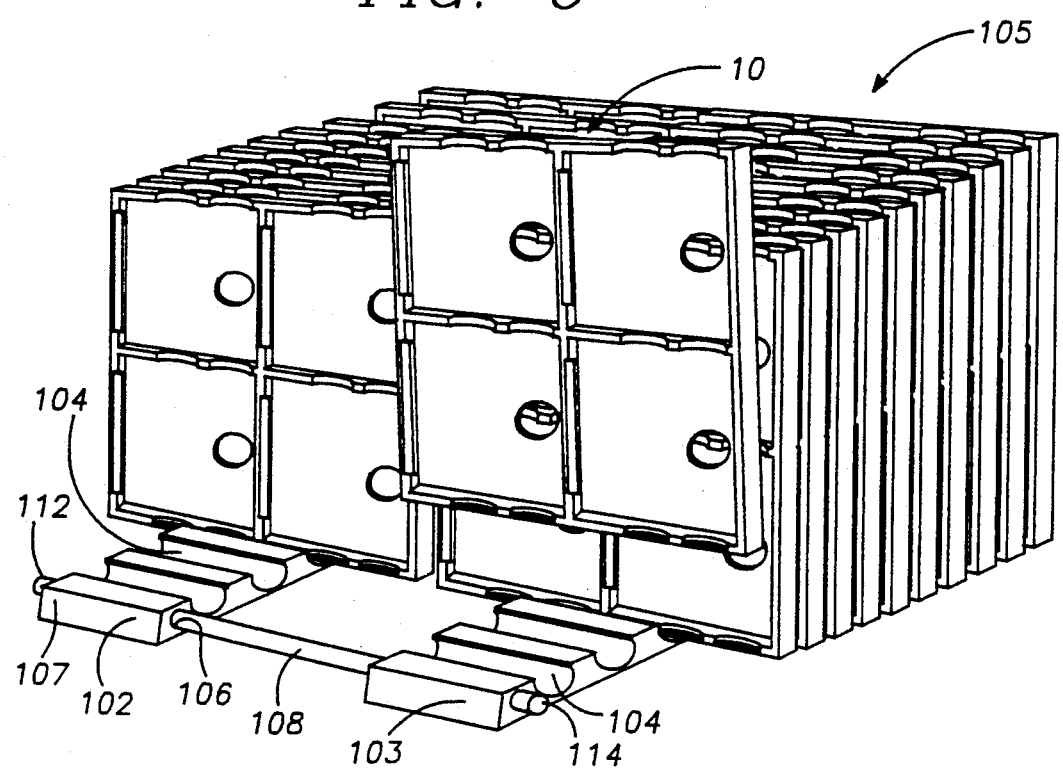
FIG. 7 is an isometric view of another embodiment of a storage apparatus in accordance with the present invention.

In another alternative embodiment, storage assembly 105 may include several storage racks connected together in a horizontal row to create an efficient storage system, as is shown in FIGS. 7 and 8. Storage assembly 105 includes two storage racks 102 and 103 having a bore 106 formed through a front end 107 of the storage racks. Although not shown, a second bore is similarly formed through the rear end of the racks 102 and 103. Connecting rod 108 is passed through bores 106, while a similar connecting rod (not shown) is inserted through the bores formed through the rear end of the storage racks. The connecting rods secure storage racks 102 and 103 together.

As is shown particularly in FIG. 8, connecting rod 108 is formed with thickened portion 110 for separating storage racks 102 and 103. The storage apparatus are preferably centered within groove 104 with a portion of apparatus 10 extending to either side of the storage rack. The thickened portion of the connecting rod separates racks 102 and 103 by a distance which is sufficient to accommodate the portion of storage apparatus 10 extending beyond the storage racks. Caps 112 and 114 interengage threaded ends 116 and 118 respectively to retain connecting rod 108 in position between the storage racks. In the present form, the connecting rod is formed to attach two storage racks together. Cap 114 may be replaced with an adapting device (not shown) to secure a second connecting rod to rod 108, adding another storage rack to storage assembly 105. Alternatively, the second connecting rod may be formed to directly engage threaded end 118. In other embodiments of the storage assembly, the connecting rod may be formed to couple a plurality of storage racks together in a horizontal row.

In the preferred form, the connecting rod couples the narrow storage racks together, with the thickened portion maintaining a predetermined separation between adjacent racks. The storage assembly 105 of the present invention creates an efficient and attractive storage system for retaining a large number of compact disk containers, efficiently storing several disk containers within a relatively small area.

Still another alternative embodiment of storage assembly 130 is shown in FIG. 9. In the present embodiment, the storage racks are arranged vertically, which is particularly suitable for a user having little floor space available for storing compact disks. The storage assembly includes a frame 132 having vertical frame rods 134 supporting vertically adjacent rack assemblies 136, 138 and 140. In the present embodiment, the components of rack assembly 136 are substantially similar to rack assemblies 138 and 140. Thus, only rack assembly 136 will be described in detail.

Rack assembly 136 includes horizontal frame members 142 having a cylindrical bore 144 formed at each end for mounting the frame members 142 to frame rods 134. In the preferred form, the frame rods 134 are press fit into cylindrical bore 144 to secure the rack assembly at a desired height along the vertical frame rod. In other embodiments, other methods for securing the frame members to vertical rods 134 may be substituted. Frame members 142 include opposed flanges 146 and 148 separated by a sufficient distance for receiving slidable rod 150. The rack assembly further includes a storage rack 102 having a plurality of spaced grooves 104. A bore 152 extends through the front of rack 102, while bore 154 passes through the rear of the storage rack. Connecting rods 156 and 158 pass through bores 152 and 154 respectively for mounting the storage rack to slidable rod 150. Bracing members 160 and 162 extend between frame members 142 to provide additional support for storage rack 102.

Rod 150 may slide along the length of the opposed flanges 146 and 148 for moving the storage rack between a stored position and a viewing position, which is indicated by the phantom lines. The forward brace member 160 may be gripped by the user to pull the storage rack from the storage position to the viewing position. Thus, brace member 160 provides a handle for facilitating the movement of rack 102. When in the viewing position, a user may efficiently flip through the storage apparatus (not shown) retained by storage rack 102. Once a selection has been made and the disk retrieved for play, the user returns rack 102 to the storage position.

Storage assembly 130 provides an efficient system for retaining a large quantity of compact disks within a fairly limited area. The compact disks stored within assembly 130 are readily accessible to the user. When he desires to play a disk, the user may conveniently select and retrieve a disk from the assembly.

What is claimed is:

1. An apparatus for storing a plurality of compact disk containers of the type having a cover, a base for supporting a compact disk and a hinged end connecting the cover to the base, a distal end opposite the hinged end, the cover being pivotable about the hinged end between a closed position and an open position, said apparatus comprising:

a storage array divided into a plurality of compartments each being defined by a peripheral partition wall having opposed first and second wall portions and opposed third and fourth wall portions extending between said first and second wall portions, said wall portions each having a lower edge, an upper edge spaced from said lower edge and an inner surface facing into the compartment, said compartments being further defined by a rear panel portion extending inwardly from said lower edge of at least one of said wall portions, said compartment being formed for receiving one of the containers with the base positioned proximate said rear panel portion, said array being configured and said compartments being arranged for holding the containers in a common plane defined by the base of the containers; and retention means for securing one of the containers within each of said compartments, said retention means including a protruding ridge extending inwardly from the first wall portion proximate said upper edge thereof, said protruding ridge having an underside spaced from said rear panel portion by a sufficient distance for receipt of the hinged end of the container below said protruding ridge when the container is inserted into one of said compartments, said inner surface of at least one of the remainder of said wall portions being formed to engage an edge of the container when the container is inserted into one of said compartments, said protruding ridge and said inner surface cooperating to retain the container within said array.

2. The apparatus of claim 1 wherein said inner surface of the second wall portion includes at least one projection formed thereon, said at least one projection extending into said compartment by a sufficient distance to engage the distal end of the container when inserted into said compartment.

3. The apparatus of claim 1 further comprising cover release means formed in at least one of said wall portions for facilitating release of the cover to pivot the cover from the closed position to the open position.

4. The apparatus of claim 3 wherein said cover release means includes at least one release indentation formed in at least one of said third and fourth wall portions, said at least one release indentation being positioned for facilitating release of the cover.

5. The apparatus of claim 1 further comprising disk removal means formed in at least one of said wall portions for facilitating the removal of the disk from the container when storing the container in said array.

6. The apparatus of claim 5 wherein said disk removal means includes at least one removal indentation formed in at least one of said third and fourth wall portions, said at least one removal indentation being positioned for facilitating the removal of the disk from the container.

7. The apparatus of claim 1 further comprising ejection means positioned in each of said compartments for facilitating the removal of the container from said array.

8. The apparatus of claim 7 wherein said ejection means includes an aperture formed in said rear panel portion, said aperture being configured and positioned to permit application of a force to the base for facilitating disengagement of said retention means and withdrawal of the hinged end from below said protruding ridge for removal of the container from said array.

9. The apparatus of claim 1 further comprising a storage rack having a plurality of grooves configured for supporting a plurality of said apparatus for storing in parallel alignment.

10. The apparatus of claim 9 in which the plurality of grooves are configured for supporting said plurality of said apparatus for storing in a substantially vertical orientation.

11. The apparatus of claim 9 further comprising a second storage rack and means for coupling the first mentioned storage rack to said second storage rack.

12. The apparatus of claim 9 further comprising at least one additional storage rack and means for supporting the first-mentioned storage rack at a position spaced vertically relative to said additional storage rack.

13. The apparatus of claim 12 wherein said supporting means includes means for moving at least one of the first-mentioned storage rack and said additional storage rack between a deployed position, for selecting one of said apparatus supported by the deployed one of the first-mentioned storage rack and said additional storage rack, and a stored position, for storing said apparatus.

14. An apparatus for storing a plurality of compact disk containers of the type having a cover, a base for supporting a compact disk and a hinged end connecting the cover to the base, a distal end opposite the hinged end, the cover being pivotable about the hinged end between a closed position and an open position, said apparatus comprising:

a storage array divided into a plurality of compartments defined by a peripheral partition wall having a first wall portion and an opposed second wall portion, a third wall portion extending between said first wall portion and said second wall portion and a fourth wall portion opposite said third wall portion, the wall portions each having an upper edge spaced from said lower edge, said compartments being further defined by a rear panel portion extending inwardly from said lower edge of at least one of said wall portions, each of said compartments being configured for receiving one of the containers therein with the base of the container positioned proximate said rear panel portion, said array being configured and said compartments being arranged for storing the containers in a common plane defined by the base of the containers;

retention means formed in said partition wall for securing the containers within one of said compartments with the cover being freely pivotable between the open position and the closed position when storing the container in said array, said retention means including a protruding ridge extending inwardly from said first wall portion adjacent said upper edge thereof, said protruding ridge having an underside, said first wall portion and said underside of said protruding ridge partially defining a recess formed to receive the hinged end of the container when the container is placed within one of said compartments, said inner surface of at least one of the remainder of said wall portions being formed for engaging an edge of the container when the container is inserted into one of said compartments, said protruding ridge and said inner surface interacting to retain the container within one of said compartments with the hinged end of the container held below said protruding ridge when storing the container in said array;

cover release means formed in at least one of said wall portions for facilitating release of the cover to pivot the cover from the closed position to the open position; and disk removal means formed in at least one of said wall portions for facilitating the removal of the disk from the container when storing the container in said array.

15. The apparatus of claim 14 wherein said inner surface of said second wall portion includes at lest one projection formed thereon, said at least one projection extending into said compartment by a sufficient distance to engage the distal end of the container.

16. The apparatus of claim 14 wherein said cover release means includes at least one release indentation formed in at least one of said third wall portion and said fourth wall portion, said at least one release indentation being positioned for facilitating release of the cover to pivot the cover from the closed position to the open position.

17. The apparatus of claim 14 wherein said disk removal means includes at least one removal indentation formed in at least one of said third wall portion and said fourth wall portion, said at least one removal indentation being positioned for facilitating the removal of the disk from the container when storing the container in said array.

18. The apparatus of claim 14 further comprising ejection means positioned in each of said compartments for facilitating the removal of the container from said array.

19. The apparatus of claim 18 wherein said ejection means includes an aperture formed in said rear panel portion of each of said compartments of aid array, said aperture being configured and positioned to permit application of a force to the base for facilitating disengagement of said retention means and withdrawal of the hinged end from said recess for removal of the container from said array.

20. The apparatus of claim 14 further comprising at least one storage rack having a plurality of grooves configured for supporting a plurality of said apparatus for storing in parallel alignment.

21. An apparatus for storing a plurality of compact disk containers of the type having a cover, a base for supporting a compact disk and a hinged end connecting the cover to the base, a distal end opposite the hinged end, the cover being pivotable about the hinged end between a closed position and an open position, said apparatus comprising:

a storage array divided into a plurality of compartments each defined by a peripheral partition wall having opposed first and second wall portions and opposed third and fourth wall portions extending transversely between said first and second wall portions, said wall portions each having a lower edge and an upper edge spaced from said lower edge, the second wall portion having an inner surface facing the first wall portion, said compartments being further defined by a rear panel portion extending inwardly from said lower edge of at least one of said wall portions, said compartments each being configured for receiving one of the containers for storage therein with the base of the container positioned proximate said rear panel portion, said array being configured and said compartments being arranged for storing the containers in a common plane defined by the base of the containers;

a protruding ridge formed on said first wall portion and at least one projection formed on said second wall portion, said protruding ridge extending inwardly from said first wall portion proximate said upper edge thereof, said protruding ridge having an underside spaced from said rear panel portion by a sufficient distance for receipt of the hinged end of the container below said protruding ridge when the container is inserted into one of said compartments, said at least one projection protruding from said inner surface of said second wall portion and extending inwardly by a sufficient distance to engage the distal end of the container when the container is inserted into one of said compartments, said protruding ridge and said at least one projection interacting to retain the container within one of said compartments with the hinged end positioned below said protruding ridge when storing the container in said array;

at least one cover release indentation formed in at least one of said third and fourth wall portions, said at lest one cover release indentation positioned for facilitating release of the cover to pivot the cover from the closed position to the open position; and at least one disk removal indentation formed in at least one of said third and fourth wall portions, said at least one disk removal indentation positioned for facilitating the removal of the disk from the container when storing the container in said array.

22. The apparatus of claim 21 further comprising an aperture formed in said rear panel portion of each of said compartments of said array, said aperture being configured and positioned to permit application of a force for dislodging the container from said at least one projection and withdrawing the hinged end from below said protruding ridge to remove the container from said array.

23. The apparatus of claim 21 wherein said array includes four of said compartments arranged in two rows each having two of said compartments.

24. The apparatus of claim 21 further comprising at least one storage rack having a plurality of grooves configured for supporting a plurality of said apparatus for storing in parallel alignment.

* * * * *